United States Patent
Zhang et al.

(10) Patent No.: US 12,284,724 B2
(45) Date of Patent: Apr. 22, 2025

(54) COMMUNICATION METHOD AND APPARATUS

(71) Applicant: HUAWEI TECHNOLOGIES CO., LTD., Guangdong (CN)

(72) Inventors: Shihao Zhang, Beijing (CN); Shuo Ma, Beijing (CN); Tao Liu, Beijing (CN); Hongqiang Chen, Beijing (CN); Xiufan Niu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 527 days.

(21) Appl. No.: 17/362,651

(22) Filed: Jun. 29, 2021

(65) Prior Publication Data
US 2021/0329445 A1 Oct. 21, 2021

Related U.S. Application Data

(63) Continuation of application No. PCT/CN2018/125848, filed on Dec. 29, 2018.

(51) Int. Cl.
*H04W 8/24* (2009.01)
*H04W 76/15* (2018.01)
*H04W 76/30* (2018.01)

(52) U.S. Cl.
CPC ............. *H04W 8/24* (2013.01); *H04W 76/15* (2018.02); *H04W 76/30* (2018.02)

(58) Field of Classification Search
None
See application file for complete search history.

(56) References Cited

U.S. PATENT DOCUMENTS

| | | | |
|---|---|---|---|
| 2010/0330959 A1* | 12/2010 | Mildh | H04W 12/037 455/410 |
| 2011/0059689 A1* | 3/2011 | Haverty | H04W 60/04 455/1 |
| 2012/0236822 A1* | 9/2012 | Fang | H04W 36/0033 370/328 |

(Continued)

FOREIGN PATENT DOCUMENTS

| | | |
|---|---|---|
| CN | 108141332 A | 6/2018 |
| CN | 108307524 A | 7/2018 |

(Continued)

*Primary Examiner* — Xavier S Wong

(57) ABSTRACT

Embodiments of this application provide a communication method and apparatus. The apparatus includes a receiving module and a sending module. When the receiving module receives a user equipment UE capability query message sent by a network device, the sending module sends a first UE capability message (including a first UE capability specification) to the network device, and when determining that a network exception occurs, sends a second UE capability message (including a second UE capability specification that is lower than the first UE capability specification) to the network device. This helps implement mutual compatibility between the terminal device and the network device, thereby ensuring that a communication link can be quickly established between the terminal device and the network device. In this way, a user can normally use the terminal device, and the terminal device can keep using a high-standard network as much as possible, thereby improving user experience.

16 Claims, 7 Drawing Sheets

(56) References Cited

U.S. PATENT DOCUMENTS

| | | | | |
|---|---|---|---|---|
| 2015/0195837 A1* | 7/2015 | Fuse | ............ | H04L 5/001 |
| | | | | 370/329 |
| 2015/0215987 A1* | 7/2015 | Kim | ............ | H04W 76/20 |
| | | | | 370/329 |
| 2015/0327107 A1 | 11/2015 | Kim et al. | | |
| 2016/0128114 A1* | 5/2016 | Moy | ............ | H04W 12/50 |
| | | | | 455/434 |
| 2017/0118787 A1* | 4/2017 | Kekki | ............ | H04L 69/14 |
| 2017/0367073 A1 | 12/2017 | Murugan et al. | | |
| 2018/0084539 A1 | 3/2018 | Kubota et al. | | |
| 2018/0227904 A1 | 8/2018 | Raghunathan et al. | | |
| 2019/0098489 A1* | 3/2019 | Shi | ............ | H04W 76/15 |
| 2020/0053820 A1* | 2/2020 | Chin | ............ | H04W 72/56 |
| 2020/0154267 A1* | 5/2020 | Soriaga | ............ | H04L 1/0026 |

FOREIGN PATENT DOCUMENTS

| | | |
|---|---|---|
| CN | 108337695 A | 7/2018 |
| CN | 108810943 A | 11/2018 |
| EP | 3410775 A1 | 12/2018 |

\* cited by examiner

COMMUNICATION METHOD AND APPARATUS

CROSS-REFERENCE TO RELATED APPLICATIONS

This application is a continuation of International Application No. PCT/CN2018/125848, filed on Dec. 29, 2018, the disclosure of which is hereby incorporated by reference in its entirety.

TECHNICAL FIELD

This application relates to the field of communication technologies, and in particular, to a communication method and apparatus.

BACKGROUND

With development of communication network technologies, a user equipment (UE) capability reported by a terminal device to a network device changes greatly compared with that in the long term evolution (LTE) technical standard, which is an initial universal mobile communication technology. In a current network status, an upgrade of a network device usually lags behind, but a specification of a terminal device is continuously improved. Consequently, it is a common phenomenon that the specification of the terminal device is higher than a specification of the network device, ie., user devices often advance technologically faster than network devices and may have capabilities that network devices are not yet adapted to support.

Usually, when the network device and the terminal device are compatible with each other, the network device allocates radio resource control (RRC) configuration information to the terminal device based on a UE capability reported by the terminal device, so that the terminal device further establishes a data link. However, because of uneven specifications of the terminal device and the network device in the current network, how to ensure compatibility between the terminal device and the network device to establish a communication link between the terminal device and the network device becomes a problem that urgently needs to be considered.

SUMMARY

Embodiments of this application provide a communication method and apparatus, to resolve, in a related technology, a technical problem that how to ensure compatibility between a terminal device and a network device to establish a communication link between the terminal device and the network device.

According to a first aspect, an embodiment of this application provides a communication apparatus. The communication apparatus is used in a terminal device, and the apparatus includes:
  a receiving module, configured to receive a user equipment UE capability query message sent by a network device; and
  a sending module, configured to send a first UE capability message to the network device when the receiving module receives the UE capability query message, where
  the sending module is further configured to send a second UE capability message to the network device when determining that a network exception occurs, and a second UE capability specification in the second UE capability message is lower than a first UE capability specification in the first UE capability message.

In the communication apparatus provided in the first aspect, when the receiving module receives the user equipment UE capability query message sent by the network device, the sending module sends the first UE capability message (including the first UE capability specification) to the network device, and when determining that a network exception occurs, sends the second UE capability message (including the second UE capability specification that is lower than the first UE capability specification) to the network device. This helps implement mutual compatibility between the terminal device and the network device, thereby ensuring that a communication link can be quickly established between the terminal device and the network device. In this way, a user can normally use the terminal device, thereby improving user experience.

In a possible implementation, the sending module is specifically configured to:
  send the second UE capability message to the network device when detecting that identification information of the network device and a corresponding UE capability compatibility specification are included in a server and that the UE capability compatibility specification is lower than the first UE capability specification, where the UE capability compatibility specification is used to indicate a UE capability specification compatible with the network device.

In a possible implementation, the sending module is specifically configured to:
  send the second UE capability message to the network device when no response from the network device is received within preset duration after the first UE capability message is sent to the network device.

In a possible implementation, the sending module is specifically configured to:
  send the second UE capability message to the network device when detecting that the network device releases a radio resource control RRC connection to the terminal device.

In a possible implementation, the second UE capability specification is determined by the communication apparatus based on the UE capability compatibility specification that corresponds to the network device and that is stored in the server, and the UE capability compatibility specification is used to indicate the UE capability specification compatible with the network device.

In a possible implementation, if the first UE capability specification includes a first carrier aggregation CA band combination quantity, a second CA band combination quantity in the second UE capability specification is less than the first CA band combination quantity.

In a possible implementation, if the first UE capability specification includes a first category level, a second category level in the second UE capability specification is lower than the first category level.

In a possible implementation, if the first UE capability specification includes a first protocol release, a release number of a second protocol release in the second UE capability specification is earlier than a release number of the first protocol release.

In a possible implementation, if the first UE capability specification supports evolved universal mobile telecommunications system UMTS terrestrial radio access and new radio dual connectivity EN-DC, the second UE capability specification does not support the EN-DC.

In a possible implementation, the sending module is specifically configured to:

send the second UE capability message to the network device when radio resource control RRC configuration information received from the network device includes configuration information that cannot be supported by the terminal device.

In a possible implementation, the second UE capability specification is obtained after the communication apparatus disables an air interface corresponding to the configuration information that cannot be supported by the terminal device and that is included in the RRC configuration information.

In a possible implementation, the sending module is further configured to report the identification information of the network device and the second UE capability specification to the server, so that another terminal device can quickly determine, based on information recorded in the server, whether a network exception occurs, and/or obtain the UE capability compatibility specification corresponding to the network device, to quickly roll back a UE capability.

In a possible implementation, the sending module is further configured to report an initial UE capability specification of the terminal device to a network device after handover when determining that the network device after handover is not an abnormal network device, so as to ensure that the terminal device can use all services of a high-standard network as much as possible.

According to a second aspect, an embodiment of this application provides a communication method. The method is applied to a terminal device, and includes:

sending a first UE capability message to a network device when receiving a user equipment UE capability query message sent by the network device; and sending a second UE capability message to the network device when determining that a network exception occurs, where a second UE capability specification in the second UE capability message is lower than a first UE capability specification in the first UE capability message.

The communication method provided in the second aspect includes: when receiving the user equipment UE capability query message sent by the network device, sending the first UE capability message (including the first UE capability specification) to the network device; and further, when determining that a network exception occurs, sending the second UE capability message (including the second UE capability specification that is lower than the first UE capability specification) to the network device. This helps implement mutual compatibility between the terminal device and the network device, thereby ensuring that a communication link can be quickly established between the terminal device and the network device. In this way, a user can normally use the terminal device, and the terminal device can keep using a high-standard network as much as possible, thereby improving user experience.

In a possible implementation, the sending a second UE capability message to the network device when determining that a network exception occurs includes:

sending the second UE capability message to the network device when detecting that identification information of the network device and a corresponding UE capability compatibility specification are included in a server and that the UE capability compatibility specification is lower than the first UE capability specification, where the UE capability compatibility specification is used to indicate a UE capability specification compatible with the network device.

In a possible implementation, the sending a second UE capability message to the network device when determining that a network exception occurs includes:

sending the second UE capability message to the network device when no response from the network device is received within preset duration after the first UE capability message is sent to the network device.

In a possible implementation, the sending a second UE capability message to the network device when determining that a network exception occurs includes:

sending the second UE capability message to the network device when detecting that the network device releases a radio resource control RRC connection to the terminal device.

In a possible implementation, the second UE capability specification is determined based on the UE capability compatibility specification that corresponds to the network device and that is stored in the server, and the UE capability compatibility specification is used to indicate the UE capability specification compatible with the network device.

In a possible implementation, if the first UE capability specification includes a first carrier aggregation CA band combination quantity, a second CA band combination quantity in the second UE capability specification is less than the first CA band combination quantity.

In a possible implementation, if the first UE capability specification includes a first category level, a second category level in the second UE capability specification is lower than the first category level.

In a possible implementation, if the first UE capability specification includes a first protocol release, a release number of a second protocol release in the second UE capability specification is earlier than a release number of the first protocol release.

In a possible implementation, if the first UE capability specification supports evolved universal mobile telecommunications system UMTS terrestrial radio access and new radio dual connectivity EN-DC, the second UE capability specification does not support the EN-DC.

In a possible implementation, the sending a second UE capability message to the network device when determining that a network exception occurs includes:

sending the second UE capability message to the network device when radio resource control RRC configuration information received from the network device includes configuration information that cannot be supported by the terminal device.

In a possible implementation, the second UE capability specification is obtained after an air interface corresponding to the configuration information that cannot be supported by the terminal device and that is included in the RRC configuration information is disabled.

In a possible implementation, the method further includes:

reporting the identification information of the network device and the second UE capability specification to the server, so that another terminal device can quickly determine, based on information recorded in the server, whether a network exception occurs, and/or obtain the UE capability compatibility specification corresponding to the network device, to quickly roll back a UE capability.

In a possible implementation, the method further includes:

reporting an initial UE capability specification of the terminal device to a network device after handover when determining that the network device after handover is not an abnormal network device, so as to ensure that the terminal device can use all services of a high-standard network as much as possible.

According to a third aspect, an embodiment of this application provides a baseband processor. The baseband processor is configured to perform the method according to any implementation of the second aspect.

According to a fourth aspect, an embodiment of this application provides a chip system, including a processor. The processor is configured to perform the method according to any implementation of the second aspect. Optionally, the chip system may include a chip, or may include a chip and another discrete device.

According to a fifth aspect, an embodiment of this application provides a terminal device, including the baseband processor according to the third aspect or the chip system according to the fourth aspect.

According to a sixth aspect, an embodiment of this application provides a terminal device, including a processor and a memory.

The memory is configured to store a program instruction.

The processor is configured to invoke and execute the program instruction stored in the memory. When the processor executes the program instruction stored in the memory, the terminal device is configured to perform the method according to any implementation of the second aspect.

According to a seventh aspect, an embodiment of this application provides a program. When the program is executed by a processor, the program is used to perform the method according to any implementation of the second aspect.

According to an eighth aspect, an embodiment of this application provides a computer program product including instructions. When the computer program product is run on a computer, the computer is enabled to perform the method according to any implementation of the second aspect of this application.

According to a ninth aspect, an embodiment of this application provides a computer-readable storage medium. The computer-readable storage medium stores instructions. When the instructions are run on a computer, the computer is enabled to perform the method according to any implementation of the second aspect.

DESCRIPTION OF EMBODIMENTS

First, explanations and descriptions are given to application frameworks and some terms related to the embodiments of this disclosure.

Figure 1A:
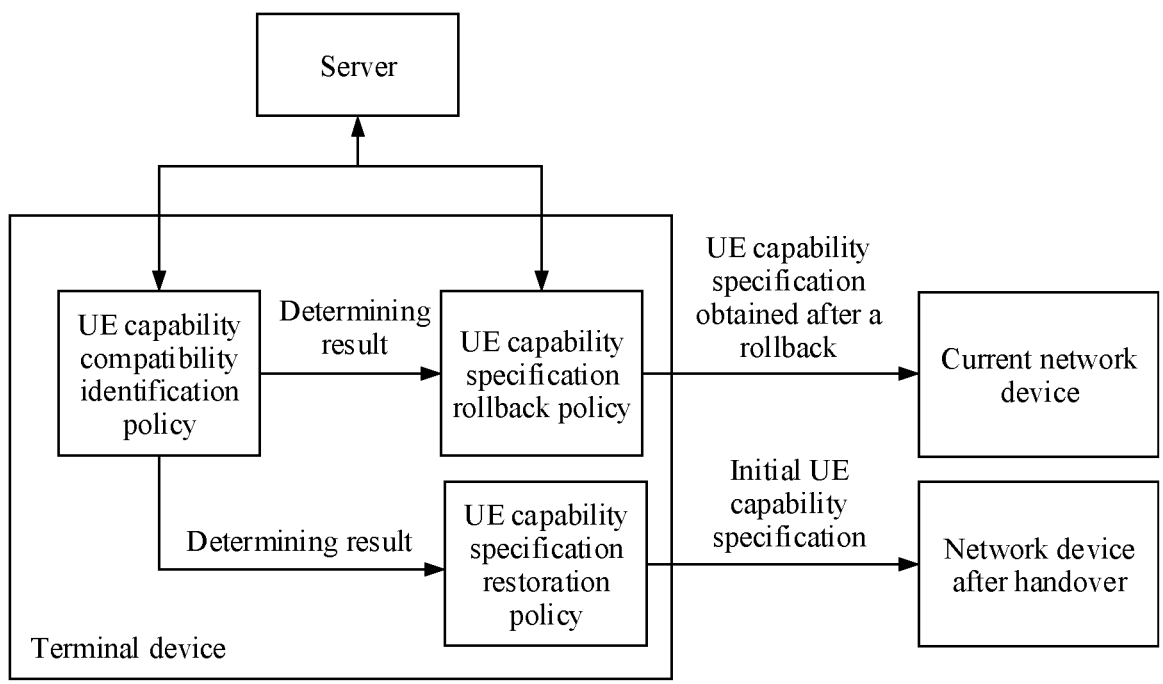
FIG. 1A is a schematic structural diagram of an application framework according to an embodiment of this application.

FIG. 1A is a schematic structural diagram of an application framework according to an embodiment of this disclosure. As shown in FIG. 1A, the application framework provided in this embodiment of this disclosure may include but is not limited to a server, a terminal device, a current network device, and a network device after handover. The server stores identification information of a plurality of abnormal network devices reported by all terminal devices and corresponding UE capability compatibility specifications. The terminal device may include but is not limited to: a user equipment (UE) capability compatibility identification policy, a UE capability specification rollback policy, and a UE capability specification restoration policy. Optionally, the UE capability compatibility identification policy, the UE capability specification rollback policy, and the UE capability specification restoration policy may belong to local configuration information of the terminal device, or belong to preconfiguration information in another manner.

The UE capability compatibility identification policy in the embodiments of this disclosure is used to determine, based on network behavior or information (for example, including but not limited to identification information of an abnormal network device and a corresponding UE capability compatibility specification) that is about a plurality of abnormal network devices and is stored in the server, whether a network exception occurs (for example, the network device cannot be compatible with a UE capability of the terminal device, or the terminal device cannot be compatible with configuration information delivered by the network device). For example, a determining result of the UE capability compatibility identification policy is used as an input of the UE capability specification rollback policy and the UE capability specification restoration policy.

The UE capability specification rollback policy in the embodiments of this disclosure is used to: when it is determined that a network exception occurs (for example, the network device cannot be compatible with a UE capability of the terminal device, or the terminal device cannot be compatible with configuration information delivered by the network device), roll back the UE capability specification of the terminal device, and reports a UE capability specification obtained after a rollback to the current network device. For example, the UE capability specification rollback policy is further used to: after the UE capability specification obtained after the rollback is reported to the current network device and a communication link is successfully established between the terminal device and the network device, report identification information of the network device and the UE capability specification obtained after the rollback to the server.

The UE capability specification restoration policy in the embodiments of this disclosure is used to determine, based on information that is about an abnormal network device and is stored in the server and/or locally recorded information about the abnormal network device, whether the network device after handover is an abnormal network device. If it is determined that the network device after handover is not an abnormal network device, the UE capability specification of the terminal device may be restored to an initial UE capability specification and is reported to the network device after handover.

A communication system to which the embodiments of this disclosure is applicable may include but is not limited to a long term evolution (LTE) communication system or a new radio (NR) communication system (for example, a fifth-generation mobile communication technology (5th-generation, 5G)). Certainly, the communication system may alternatively be another type of communication system. This is not limited in the embodiments of this disclosure.

The communication method provided in the embodiments of this application may be performed by the terminal device, or may be performed by a communication apparatus in the terminal device (it should be noted that the terminal device is used as an example for description in the embodiments provided in this application). For example, the communication apparatus may be a chip system, a circuit, a module, or the like. This is not limited in this application.

The terminal device (or may be referred to as a terminal) in this application may be a wireless terminal or a wired terminal. The wireless terminal may be a device that provides a user with a voice and/or another service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, for example, a portable, pocket-sized, handheld, computer built-in, or vehicle-mounted mobile apparatus, which exchanges voice and/or data with the radio access network. For example, the wireless terminal may be a device such as a personal communications service (PCS) phone, a cordless phone, a session initiation protocol (SIP) phone, a wireless local loop WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, or user equipment (UE), which is not limited herein.

The network device in the embodiments of this application may include but is not limited to a base station and a transmission/reception point (TRP). The base station, also referred to as a radio access network (RAN) device, is a device for connecting a terminal to a wireless network, and may be a base transceiver station (BTS) in global system for mobile communications (GSM) or code division multiple access (CDMA), or may be a Node B (nodeB, NB) in wideband code division multiple access (WCDMA), or may be an evolved Node B (evolutional node B, eNB or eNodeB) in long term evolution (LTE), or a relay station or an access point, or a gNodeB (gNB) in a future 5G network, which is not limited herein.

The terminal device in this application may include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one (piece) of the following" or a similar expression thereof means any combination of these items, including a singular item (piece) or any combination of plural items (pieces). For example, at least one (piece) of a, b, or c may represent: a, b, c, a and b, a and c, b and c, or a, b, and c, where a, b, and c may be singular or plural.

Numbers in the embodiments of this application, such as "first" and "second", are used to distinguish between similar objects, but are not necessarily used to describe a specific order or sequence, and should not constitute any limitation on the embodiments of this application.

The UE capability compatibility specification corresponding to the network device in the embodiments of this application is used to indicate a UE capability specification compatible with the network device.

For example, the UE capability specification in the embodiments of this application may include but is not limited to at least one of the following: a carrier aggregation (CA) combination quantity, a category level, a protocol release, or evolved universal mobile telecommunications system (UMTS) terrestrial radio access and new radio dual connectivity (E-UTRA NR Dual Connectivity, EN-DC), and certainly, may further include other capability information. This is not limited in the embodiments of this application.

For example, if the UE capability specification includes the EN-DC, it indicates that the UE capability specification (or the terminal device) supports the EN-DC. If the UE capability specification does not include the EN-DC, it indicates that the UE capability specification (or the terminal device) does not support the EN-DC.

The CA band combination quantity in the embodiments of this application is used to indicate a carrier aggregation capability (equivalent to determining a value obtained after the UE capability is encoded) supported by the terminal device. For example, the CA band combination quantity may be indicated by using a radio frequency parameter item in a 4G UE capability reported to the network device.

The category level in the embodiments of this application is used to indicate a traffic peak capability of the terminal device. For example, the category level may be indicated by using a ue-category item in the 4G UE capability reported to the network device.

The protocol release in the embodiments of this application is used to indicate a maximum protocol feature supported by the terminal device. For example, the protocol release may be indicated by using an access stratum release item in the 4G UE capability reported to the network device.

The EN-DC in the embodiments of this application is used to indicate whether the terminal device supports 5G in a non-standalone (NSA) mode. For example, the EN-DC may be indicated by using a capability item in a release 15 in the 4G UE capability reported to the network device.

Quadrature amplitude modulation (QAM) in the embodiments of this application may include but is not limited to 64 QAM or 256 QAM.

With development of communication network technologies, a UE capability reported by a terminal device to a network device changes greatly compared with that in the LTE technical standard, which is an initial universal mobile communication technology. In a current network status, an upgrade of a network device usually lags behind, but a specification of a terminal device (for example, an LTE protocol release has developed from an earliest release 8 to the release 15 that supports a 5G NSA mode, and has gradually evolved from an earliest LTE single carrier to a multi-carrier) is continuously improved. Consequently, it is a common phenomenon that the specification of the terminal device is higher than a specification of the network device.

If the network device cannot be compatible with the terminal device, or the terminal device cannot be compatible with RRC configuration information delivered by the network device, a current standard of the terminal device is unavailable, thereby severely affecting user experience.

Figure 1B:
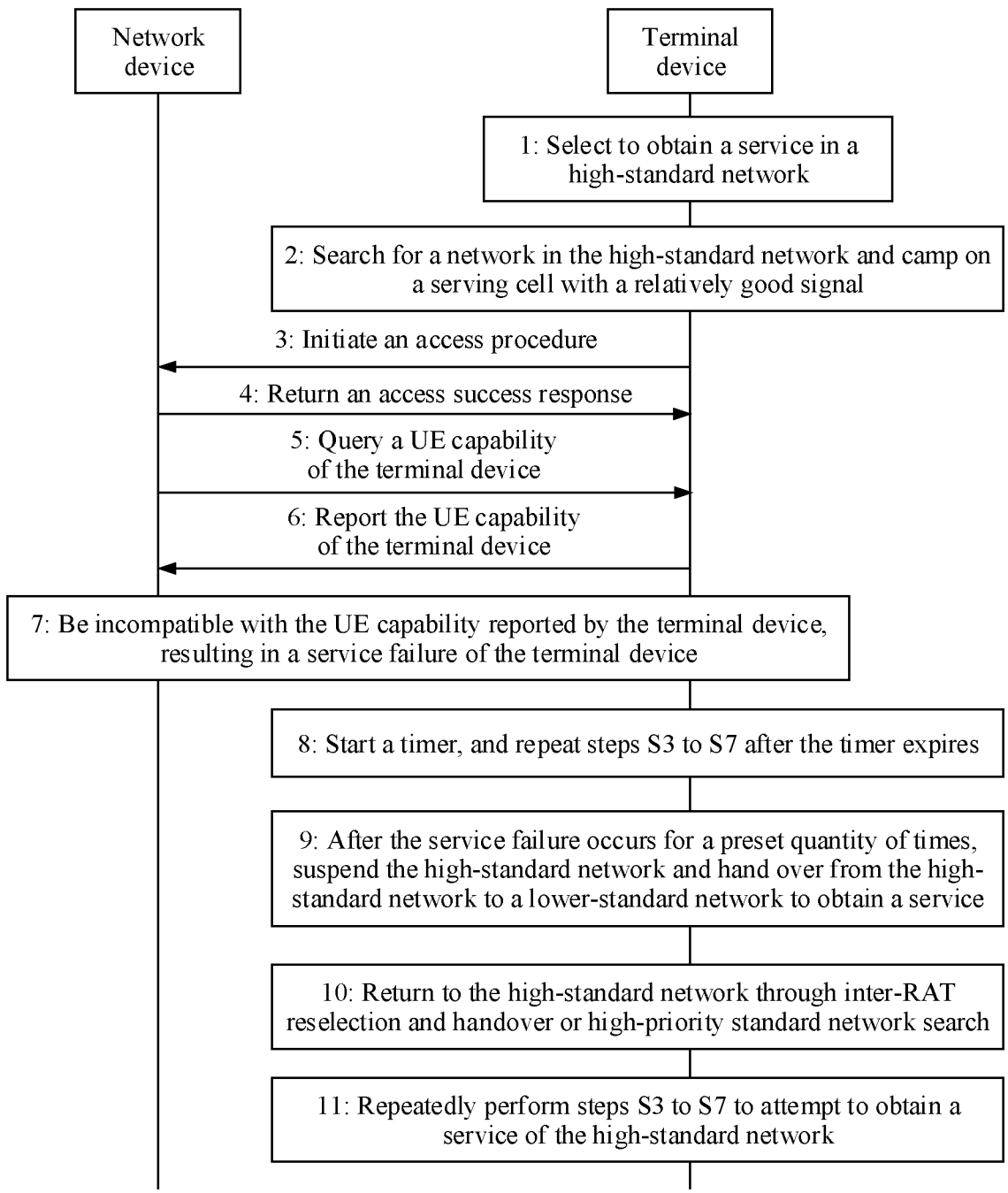
FIG. 1B is a schematic flowchart of a communication method when a network device cannot be compatible with a terminal device according to a related technology.

FIG. 1B is a schematic flowchart of a communication method when a network device cannot be compatible with a terminal device according to a related technology. As shown in FIG. 1B, the communication method provided in the related technology may include:

Step 1: The terminal device selects to obtain a service in a high-standard network (for example, 4G).

Step 2: The terminal device searches for a network in the high-standard network (for example, 4G) and camps on a serving cell with a relatively good signal.

For example, because a release of a network device of the serving cell is relatively early, the network device is incompatible with a terminal device with a relatively high capability specification.

Step 3: The terminal device initiates an access procedure to the network device.

For example, the terminal device initiates a service procedure including attach, a data service, a location update, or the like, to trigger a terminal to access the network.

Step 4: The network device returns an access success response.

Step 5: The network device queries a UE capability of the terminal device.

Step 6: The terminal device reports the UE capability of the terminal device to the network device.

For example, the UE capability reported by the terminal device includes a capability that is incompatible with the network device (for example, a relatively large CA band combination quantity, a relatively late protocol release, a relatively high category level, or an EN-DC supported capability).

Step 7: The network device is incompatible with the UE capability reported by the terminal device, resulting in a service failure of the terminal device.

Step 8: The terminal device starts a timer, and repeats steps S3 to S7 after the timer expires.

Because the terminal device reports the same UE capability each time, if a compatibility problem of the network device still exists, a service failure is also caused.

Step 9: After the service failure occurs for a preset quantity of times, the terminal device suspends the high-standard network (for example, 4G) and hands over from the high-standard network (for example, 4G) to a lower-standard network (for example, 3G or 2G) to obtain a service.

Step 10: The terminal device returns to the high-standard network (for example, 4G) through inter-RAT reselection and handover or high-priority standard network search.

Step 11: The terminal device repeatedly performs steps S3 to S7 to attempt to obtain a service of the high-standard network (for example, 4G).

If the network device is still incompatible with the UE capability reported by the terminal device, steps S3 to S9 are still repeatedly performed. Consequently, the terminal device cannot obtain a high-quality service.

It may be learned that in the related technology, when the network device is incompatible with the UE capability of the terminal device, the terminal device obtains a service in a low-priority standard network after a plurality of attempts, and the terminal device cannot obtain a basic communication service in an attempt process. Consequently, user experience is poor.

Figure 1C:
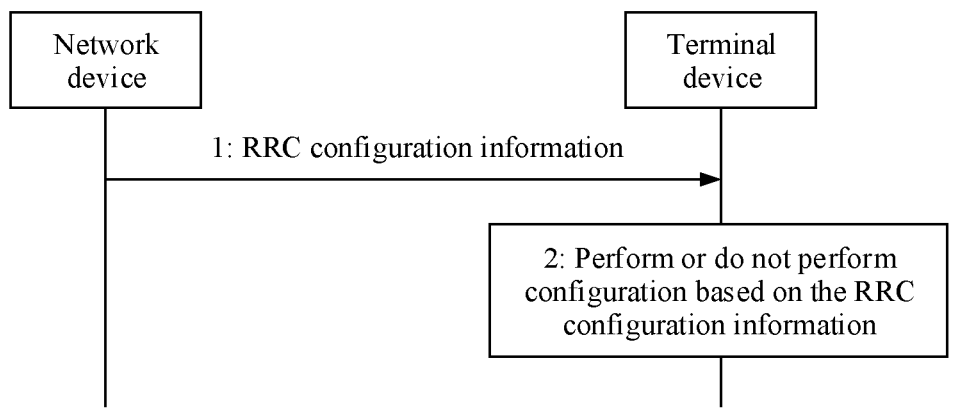
FIG. 1C is a schematic flowchart of a communication method when a terminal device cannot be compatible with RRC configuration information delivered by a network device according to a related technology.

FIG. 1C is a schematic flowchart of a communication method when a terminal device cannot be compatible with RRC configuration information delivered by a network device according to a related technology. As shown in FIG. 1C, the communication method provided in the related technology may include:

Step 1: The network device sends the RRC configuration information to the terminal device.

For example, the RRC configuration information does not match a UE capability reported by the terminal device. Consequently, the RRC configuration information includes configuration information that cannot be supported by the terminal device.

Step 2: The terminal device performs or does not perform configuration based on the RRC configuration information.

It may be learned that in the related technology, when the terminal device cannot be compatible with the RRC configuration information delivered by the network device, regardless of whether the terminal device performs or does not perform configuration based on the RRC configuration information, a data link exception may be caused, to affect user experience.

In conclusion, how to ensure compatibility between the terminal device and the network device to establish a communication link between the terminal device and the network device becomes a problem that urgently needs to be considered.

According to the communication method and apparatus provided in the embodiments of this application, when a user equipment UE capability query message sent by a network device is received, a first UE capability message (including a first UE capability specification) is sent to the network device; and further, when it is determined that a network exception occurs, a second UE capability message (including a second UE capability specification that is lower than the first UE capability specification) is sent to the network device. This helps implement mutual compatibility between a terminal device and the network device, thereby resolving a technical problem that how to ensure compatibility between the terminal device and the network device to establish a communication link between the terminal device and the network device in the related technology.

The following uses specific embodiments to describe in detail the technical solutions of this application and how to resolve the foregoing technical problem in the technical solutions of this application. The following specific embodiments may be mutually combined, and same or similar concepts or processes may not be repeatedly described in some embodiments.

Figure 2:
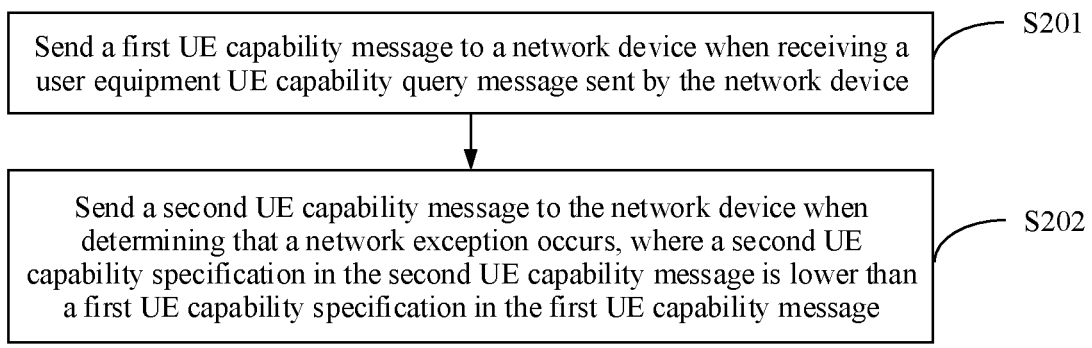
FIG. 2 is a schematic flowchart of a communication method according to an embodiment of this application.

FIG. 2 is a flowchart of a communication method according to an embodiment of this application. Optionally, the communication method provided in the embodiments of this application may be performed by a terminal device or may be performed by a communication apparatus in the terminal device (it should be noted that the terminal device is used as an example for description in the embodiments provided in this application). As shown in FIG. 2, the method in this embodiment of this application may include the following steps.

Step S201: Send a first UE capability message to a network device when receiving a user equipment UE capability query message sent by the network device.

In this step, when receiving the user equipment UE capability query message sent by the network device, the terminal device may send the first UE capability message to the network device. The first UE capability message includes a first UE capability specification. For example, the first UE capability specification may include but is not limited to at least one of the following: a first carrier aggregation CA band combination quantity (used to indicate a carrier aggregation capability supported by the terminal device), a first category level (used to indicate a traffic peak capability of the terminal device), a first protocol release (used to indicate a maximum protocol feature supported by the terminal device), and EN-DC (used to indicate whether the terminal device supports 5G in an NSA mode).

For example, if the first UE capability specification includes the EN-DC, it indicates that the first UE capability specification (or the terminal device) supports the EN-DC. If the first UE capability specification does not include the EN-DC, it indicates that the first UE capability specification (or the terminal device) does not support the EN-DC.

For example, the first UE capability specification may be an initial UE capability specification of the terminal device at delivery, or may be a UE capability specification obtained after a previous capability specification is rolled back.

For example, the first UE capability message may be a first UE capability information (capability information) air interface message, and certainly, may alternatively be another message. This is not limited in this embodiment of this application.

Step S202: Send a second UE capability message to the network device when determining that a network exception occurs, where a second UE capability specification in the second UE capability message is lower than the first UE capability specification in the first UE capability message.

In this step, when determining that a network exception occurs (for example, the network device cannot be compatible with the terminal device or the terminal device cannot be compatible with radio resource control RRC configuration information delivered by the network device), the terminal device may roll back the first UE capability specification, add, to the second UE capability message, the second UE capability specification (where the second UE capability specification is lower than the first UE capability specification) obtained after the rollback, and send the second UE capability message to the network device, to implement that the terminal device and the network device can be compatible with each other.

For example, the second UE capability message may be a second UE capability information air interface message, and certainly, may alternatively be another message. This is not limited in this embodiment of this application.

The following part of this embodiment of this application describes "the second UE capability specification is lower than the first UE capability specification".

For example, it is assumed that the first UE capability specification includes a first carrier aggregation CA band combination quantity, a first category level, a first protocol release, and EN-DC. In this case, the second UE capability specification may include but is not limited to at least one of the following: a second carrier CA band combination quantity that is in the second UE capability specification and that is less than the first CA band combination quantity, a second category level that is in the second UE capability specification and that is lower than the first category level, or a release number that is of a second protocol release in the second UE capability specification and that is earlier than a release number of the first protocol release, or the second UE capability specification does not include the EN-DC.

For example, it is assumed that the first UE capability specification includes a first carrier aggregation CA band combination quantity, EN-DC, and QAM. In this case, the second UE capability specification may include but is not limited to at least one of the following: the second UE capability specification does not include a CA band combination quantity (in other words, a CA function is not supported), the second UE capability specification does not include QAM (in other words, a QAM function is not supported), or the second UE capability specification does not include EN-DC (in other words, an EN-DC function is not supported).

The following part of this embodiment of this application describes a possible implementation of "determining a network exception".

In a possible implementation, the terminal device sends the second UE capability message to the network device when detecting that identification information of the network device and a corresponding UE capability compatibility specification are included in a server and that the UE capability compatibility specification is lower than the first UE capability specification, where the UE capability compatibility specification is used to indicate a UE capability specification compatible with the network device.

In this embodiment, the server may include identification information of a plurality of abnormal network devices and corresponding UE capability compatibility specifications (used to indicate the UE capability specifications compatible with the corresponding abnormal network devices). For example, the server may include: identification information of an abnormal network device 1 and a corresponding UE capability compatibility specification 1, identification information of an abnormal network device 2 and a corresponding UE capability compatibility specification 2, and identification information of an abnormal network device 3 and a corresponding UE capability compatibility specification 3.

In this implementation, the terminal device may send a capability specification query message to the server, where the capability specification query message includes the identification information of the network device (for example, the identification information of the abnormal network device 2). Further, the terminal device receives a capability specification response message sent by the server, where the capability specification response message includes the UE capability compatibility specification (for example, the UE capability compatibility specification 2) corresponding to the identification information of the network device. Further, when the UE capability compatibility specification (for example, the UE capability compatibility specification 2) corresponding to the identification information of the network device is lower than the first UE capability specification, the terminal device may determine that a network exception occurs because the network device cannot be compatible with the UE capability of the terminal device. Therefore, the first UE capability specification needs to be rolled back, and the second UE capability specification obtained after the rollback is carried in the second UE capability message to be sent to the network device, so that the network device can be compatible with the terminal device.

For example, it is assumed that the first UE capability specification includes the first carrier aggregation CA band combination quantity, the first category level, the first protocol release, and the EN-DC. In this case, that the UE capability compatibility specification corresponding to the identification information of the network device is lower than the first UE capability specification means at least one of the following: a CA band combination quantity included in the UE capability compatibility specification corresponding to the identification information of the network device is less than the first CA band combination quantity, a category level included in the UE capability compatibility specification corresponding to the identification information of the network device is lower than the first category level, a release number of a protocol release included in the UE capability compatibility specification corresponding to the identification information of the network device is earlier than the release number of the first protocol release, or the UE capability compatibility specification corresponding to the identification information of the network device does not include the EN-DC.

In another possible implementation, when the terminal device does not receive a response from the network device within preset duration after the terminal device sends the first UE capability message to the network device, the terminal device may determine that a network exception occurs because the network device cannot be compatible with the UE capability of the terminal device. Therefore, the first UE capability specification needs to be rolled back, and the second UE capability specification obtained after the rollback is carried in the second UE capability message to be sent to the network device, so that the network device can be compatible with the terminal device.

In another possible implementation, the terminal device sends the second UE capability message to the network device when detecting that the network device releases a radio resource control RRC connection to the terminal device.

In this embodiment, after the network device receives the first UE capability message sent by the terminal device and releases the radio resource control RRC connection to the terminal device, the network device sends an air interface message (used to indicate that the RRC connection is released) to the terminal device.

In this implementation, when the terminal device receives the air interface message sent by the network device, the terminal device may determine that a network exception occurs caused by a fact that the network device may release the RRC connection to the terminal device because the network device cannot be compatible with the UE capability of the terminal device. Therefore, the first UE capability specification needs to be rolled back, and the second UE capability specification obtained after the rollback is carried in the second UE capability message to be sent to the network device, so that the network device can be compatible with the terminal device.

In another possible implementation, when the RRC configuration information received by the terminal device from the network device includes configuration information that cannot be supported by the terminal device, the terminal device may determine that a network exception occurs because the terminal device cannot be compatible with the RRC configuration information delivered by the network device. Therefore, the first UE capability specification needs to be rolled back, and the second UE capability specification obtained after the rollback is carried in the second UE capability message to be sent to the network device, so that the network device reallocates, to the terminal device based on the second UE capability specification, RRC configuration information supported by the terminal device.

Certainly, the network exception may alternatively be determined by using another implementation. This is not limited in this embodiment of this application.

With reference to the foregoing implementations of "determining a network exception", the following part of this embodiment of this application describes a manner of determining the "second UE capability specification".

For example, when the terminal device determines that the network device cannot be compatible with the terminal device, and the server includes the UE capability compatibility specification corresponding to the network device, the second UE capability specification may be determined by the terminal device based on the UE capability compatibility specification that corresponds to the network device and that is stored in the server. For example, it is assumed that the first UE capability specification includes: the first CA band combination quantity, the first category level, and the first protocol release. In this case, the UE capability compatibility specification that corresponds to the network device and that is stored in the server includes: a CA band combination quantity 1 (less than the first CA band combination quantity), a category level 1 (lower than the first category level), and a protocol release 1 (whose release number is earlier than the release number of the first protocol release). In this case, the terminal device may roll back the first CA band combination quantity in the first UE capability specification to the CA band combination quantity 1 (that is, the second CA band combination quantity in the second UE capability specification), the first category level to the category level 1 (that is, the second category level in the second UE capability specification), and the first protocol release to the protocol release 1 (that is, the second protocol release in the second UE capability specification).

For example, when the terminal device determines that the network device cannot be compatible with the terminal device, the second UE capability specification may alternatively be determined by the terminal device according to a preset rollback policy (for example, a phased rollback policy). The phased rollback policy means that a capability in the first UE capability specification is rolled back in a phased manner. For example, the first CA band combination quantity may be gradually rolled back to a less CA band combination quantity, and then rolled back to a minimum combination quantity. The first category level may be gradually rolled back to a lower level, and then rolled back to a lowest level. The first protocol release may be gradually rolled back to a protocol release with an earlier release number, and then rolled back to a protocol release with an earliest release number.

For example, when the terminal device determines that the network device cannot be compatible with the terminal device, if the first UE capability specification includes the first carrier aggregation CA band combination quantity, the second CA band combination quantity in the second UE capability specification may be less than the first CA band combination quantity. If the first UE capability specification includes the first category level, the second category level in the second UE capability specification may be lower than the first category level. If the first UE capability specification includes the first protocol release, the release number of the second protocol release in the second UE capability specification may be lower than the release number of the first protocol release. If the first UE capability specification supports the evolved UMTS terrestrial radio access and new radio dual connectivity EN-DC, the second UE capability specification may not support the EN-DC (or the second UE capability specification does not include the EN-DC).

For example, when the terminal device determines that the terminal device cannot be compatible with the RRC configuration information delivered by the network device, the second UE capability specification may be obtained after the terminal device disables an air interface corresponding to the configuration information that cannot be supported by the terminal device and that is included in the RRC configuration information. For example, it is assumed that the RRC configuration information includes CA configuration information that cannot be supported by the terminal device. In this case, the second UE capability specification may be obtained after the terminal device disables a CA air interface (that is, the second UE capability specification does not include a CA band combination quantity). It is assumed that the RRC configuration information includes QAM configuration information that cannot be supported by the terminal device. In this case, the second UE capability specification may be obtained after the terminal device disables a QAM air interface (that is, the second UE capability specification does not include QAM). It is assumed that the RRC configuration information includes EN-DC configuration information that cannot be supported by the terminal device. In this case, the second UE capability specification may be obtained after the terminal device disables an EN-DC air interface (that is, the second UE capability specification does not include EN-DC).

In this embodiment of this application, when the user equipment UE capability query message sent by the network device is received, the first UE capability message (including the first UE capability specification) is sent to the network device; and further, when it is determined that a network exception occurs, the second UE capability message (including the second UE capability specification that is lower than the first UE capability specification) is sent to the network device. This helps implement mutual compatibility between the terminal device and the network device, thereby ensuring that a communication link can be quickly established between the terminal device and the network device. In this way, a user can normally use the terminal device, and the terminal device can keep using a high-standard network as much as possible, thereby improving user experience.

Further, to help another terminal device quickly determine, based on information recorded in the server, whether a network exception occurs, and/or obtain a UE capability compatibility specification corresponding to the network device to quickly perform a UE capability rollback, based on the foregoing embodiments, in this embodiment of this application, after the second capability specification is sent to the network device and a communication link is successfully established with the network device, it indicates that the second UE capability specification is the UE capability specification that is compatible with the network device. Therefore, the terminal device may further report the identification information of the network device and the second UE capability specification to the server, so that the server stores the identification information of the network device and the second UE capability specification.

Further, to ensure that the terminal device can use all services of the high-standard network as much as possible, when it is determined that a network device after handover is not an abnormal network device (for example, the server does not include identification information of the network device after handover), the terminal device may report, to the network device after handover, an initial UE capability specification of the terminal device, so that the network device after handover may allocate RRC configuration information to the terminal device based on the initial UE capability specification of the terminal device to establish a data link corresponding to the high-standard network with the terminal device.

Figure 3:
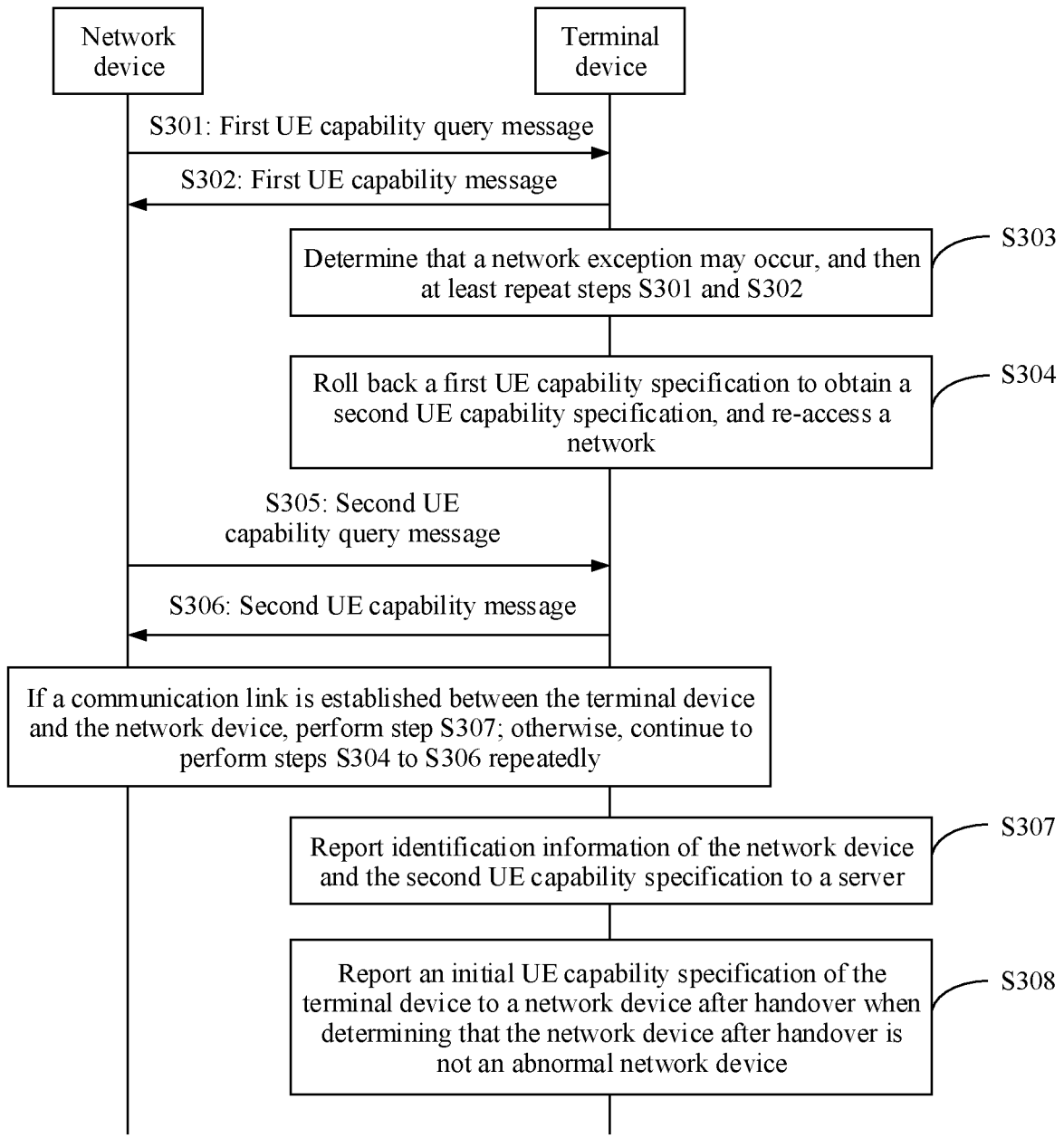
FIG. 3 is a schematic flowchart of a communication method according to another embodiment of this application.

FIG. 3 is a schematic flowchart of a communication method according to another embodiment of this application. Based on the foregoing embodiments, in this embodiment of this application, an example in which a server does not include identification information of a network device on which a terminal device currently camps or a corresponding UE capability compatibility specification is used to describe the communication method with reference to a network device side and a terminal device side. As shown in FIG. 3, the method in this embodiment of this application may include the following steps.

Step S301: The network device sends a first UE capability query message to the terminal device.

Step S302: The terminal device sends a first UE capability message to the network device. The first UE capability message includes a first UE capability specification.

Step S303: If the terminal device determines that a network exception may occur, the terminal device may at least repeat steps S301 and S302.

For example, when the terminal device does not receive a response from the network device within preset duration after the terminal device sends the first UE capability message to the network device, the terminal device may determine that a network exception may occur. Alternatively, when the terminal device detects that the network device releases an RRC connection to the terminal device, the terminal device may determine that a network exception may occur.

To avoid a misdetermination, if the terminal device determines, at least twice, that a network exception may occur, the terminal device may determine that a network exception occurs, and performs step S304.

Step S304: The terminal device rolls back the first UE capability specification to obtain a second UE capability specification, and re-accesses a network.

For example, to ensure that the terminal device can continue to use a high-standard network (for example, a 4G network, a 4.5G network, or a 5G network) when a network exception occurs, the terminal device does not roll back the first UE capability specification to a minimum specification at a time, and may gradually roll back the first UE capability specification according to a preset rollback policy (for example, a phased rollback policy). For ease of understanding, the following part of this embodiment of this application describes a possible implementation of the phased rollback policy by using an example in which "the first UE capability specification includes a first CA band combination quantity, a first category level, a first protocol release (for example, a release 15), and EN-DC".

(1) First UE capability specification rollback: The first protocol release is rolled back from the release 15 to a release 14, and a feature parameter related to a protocol release is rolled back to a feature parameter corresponding to the release 14 (for example, the first CA band combination quantity is rolled back to a CA band combination quantity corresponding to the release 14, the first category level is rolled back to a category level corresponding to the release 14, and supporting the EN-DC is rolled back to not supporting the EN-DC).

(2) Second UE capability specification rollback: The release 14 is rolled back to a release 10, and the feature parameter related to the protocol release is rolled back to a feature parameter corresponding to the release 10 (for example, a CA band combination related to a serving cell and a CA band combination preset by a terminal device vendor are retained).

(3) Third UE capability specification rollback: The release 10 is rolled back to a release 9, and the feature parameter related to the protocol release is rolled back to a feature parameter corresponding to the release 9 (for example, supporting CA is rolled back to not supporting the CA).

Certainly, the phased rollback policy may further include another implementation. This is not limited in this embodiment of this application.

Step S305: The network device sends a second UE capability query message to the terminal device.

Step S306: The terminal device sends a second UE capability message to the network device. The second UE capability message includes the second UE capability specification.

For example, if a communication link is established between the terminal device and the network device, step S307 is performed; otherwise, steps S304 to S306 continue to be performed repeatedly.

Step S307: The terminal device reports identification information of the network device and the second UE capability specification to a server.

Step S308: The terminal device may report an initial UE capability specification of the terminal device to a network device after handover when determining that the network device after handover is not an abnormal network device.

Optionally, in this embodiment, before step S301, a procedure in which the terminal device searches for a network and accesses the network may be further included. For a specific procedure, refer to the procedure in the related technology shown in FIG. 1B. Details are not described herein again.

In conclusion, in this embodiment of this application, when determining, at least twice, that a network exception may occur, the terminal device rolls back the first UE capability specification to obtain the second UE capability specification, and reports the second UE capability specification to the network device, so that the network device can be compatible with the terminal device. This can ensure that a communication link can be successfully established between the terminal device and the network device, so that the terminal device can keep using a high-standard network as much as possible, to improve user experience.

Figure 4:
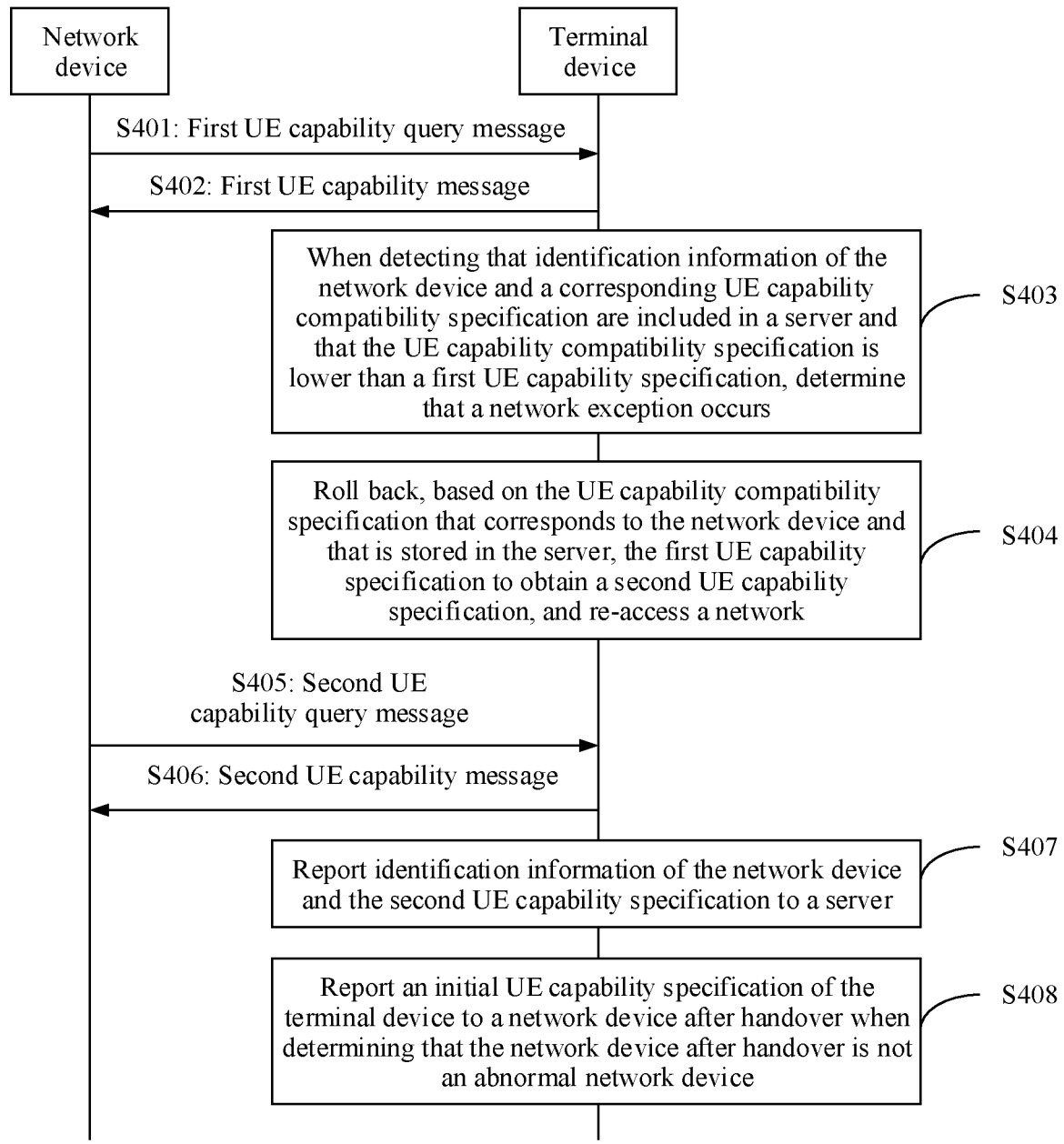
FIG. 4 is a schematic flowchart of a communication method according to another embodiment of this application.

FIG. 4 is a schematic flowchart of a communication method according to another embodiment of this application. Based on the foregoing embodiments, in this embodiment of this application, an example in which a server includes identification information of a network device on which a terminal device currently camps and a corresponding UE capability compatibility specification is used to describe the communication method with reference to a network device side and a terminal device side. As shown in FIG. 4, the method in this embodiment of this application may include the following steps.

Step S401: The network device sends a first UE capability query message to the terminal device.

Step S402: The terminal device sends a first UE capability message to the network device. The first UE capability message includes a first UE capability specification.

Step S403: When detecting that identification information of the network device and a corresponding UE capability compatibility specification are included in a server and that the UE capability compatibility specification is lower than the first UE capability specification, the terminal device determines that a network exception occurs.

Step S404: The terminal device rolls back, based on the UE capability compatibility specification that corresponds to the network device and that is stored in the server, the first UE capability specification to obtain a second UE capability specification, and re-accesses a network.

Step S405: The network device sends a second UE capability query message to the terminal device.

Step S406: The terminal device sends a second UE capability message to the network device. The second UE capability message includes the second UE capability specification.

For example, if a communication link is established between the terminal device and the network device, step S407 is performed; otherwise, steps S404 to S406 continue to be performed repeatedly.

Step S407: The terminal device reports identification information of the network device and the second UE capability specification to a server.

Step S408: The terminal device may report an initial UE capability specification of the terminal device to a network device after handover when determining that the network device after handover is not an abnormal network device.

Optionally, in this embodiment, before step S401, a procedure in which the terminal device searches for a network and accesses the network may be further included. For a specific procedure, refer to the procedure in the related technology shown in FIG. 1B. Details are not described herein again.

In conclusion, in this embodiment of this application, the terminal device may quickly determine, based on the identification information that is of the abnormal network device and that is in the server and the corresponding UE capability specification, whether the currently camped network device is abnormal. Further, when determining that the network is abnormal, the terminal device may quickly roll back the first UE capability specification based on the UE capability compatibility specification that corresponds to the network device and that is stored in the server, to obtain the second UE capability specification, and report the second UE capability specification to the network device, to quickly implement mutual compatibility between the network device and the terminal device. It may be learned that a quantity of rollbacks is greatly reduced, to further improve user experience.

Figure 5:
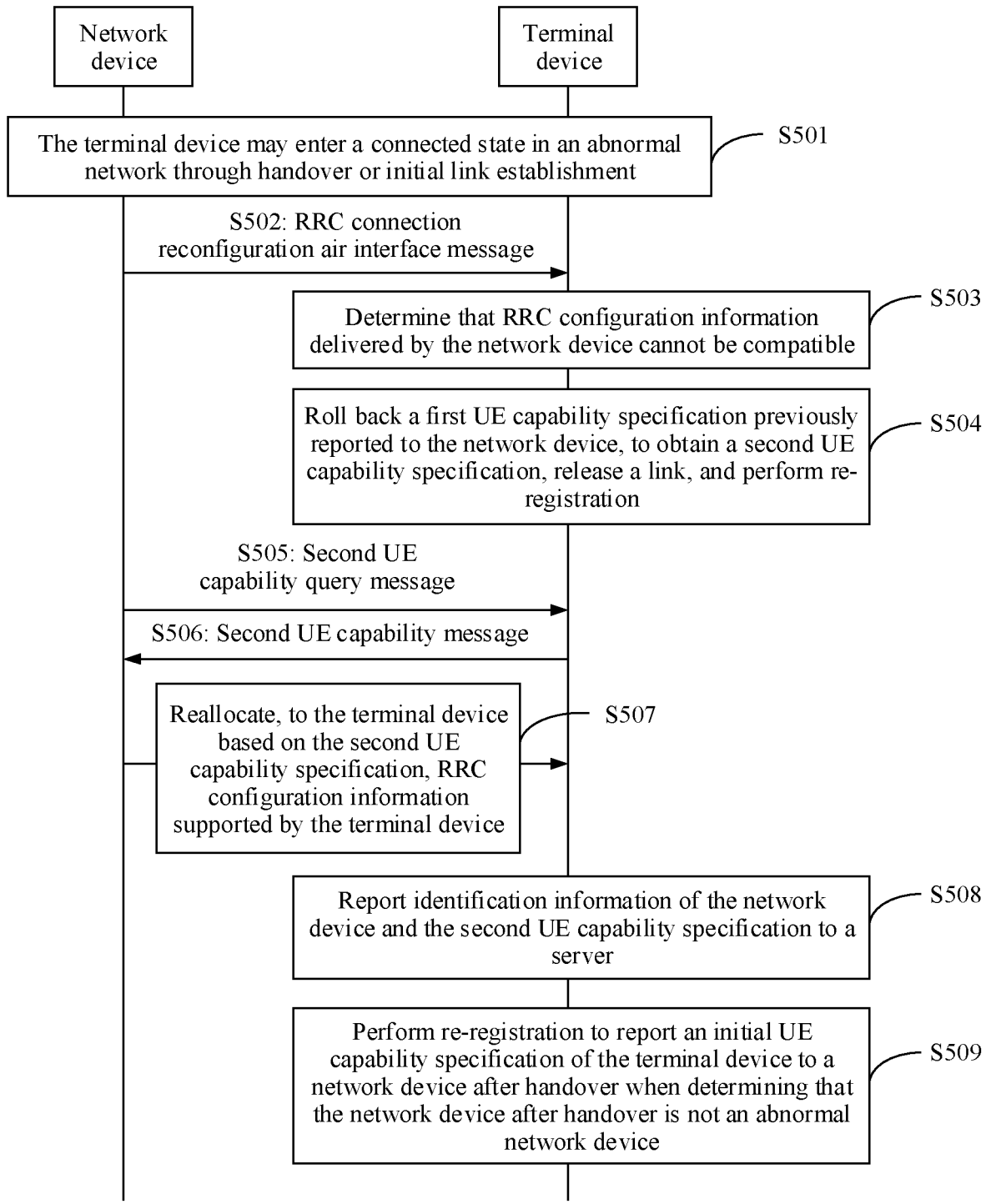
FIG. 5 is a schematic flowchart of a communication method according to another embodiment of this application.

FIG. 5 is a schematic flowchart of a communication method according to another embodiment of this application. Based on the foregoing embodiments, in this embodiment of this application, an example in which a terminal device determines that the terminal device cannot be compatible with RRC configuration information delivered by a network device is used to describe the communication method with reference to a network device side and a terminal device side. As shown in FIG. 5, the method in this embodiment of this application may include the following steps.

Step S501: The terminal device may enter a connected state in an abnormal network through handover or initial link establishment.

Step S502: The network device sends an RRC connection reconfiguration air interface message to the terminal device. The RRC connection reconfiguration air interface message includes the RRC configuration information (for example, includes configuration information that cannot be supported by the terminal device).

Step S503: The terminal device determines that the terminal device cannot be compatible with the RRC configuration information delivered by the network device.

Step S504: The terminal device rolls back a first UE capability specification previously reported to the network device, to obtain a second UE capability specification, releases a link, and performs re-registration.

For example, it is assumed that the RRC configuration information includes CA configuration information that cannot be supported by the terminal device. In this case, the second UE capability specification may be obtained after the terminal device disables a CA air interface (that is, the second UE capability specification does not include a CA band combination quantity). It is assumed that the RRC configuration information includes QAM configuration information that cannot be supported by the terminal device. In this case, the second UE capability specification may be obtained after the terminal device disables a QAM air interface (that is, the second UE capability specification does not include QAM). It is assumed that the RRC configuration information includes EN-DC configuration information that cannot be supported by the terminal device. In this case, the second UE capability specification may be obtained after the terminal device disables an EN-DC air interface (that is, the second UE capability specification does not include EN-DC).

For example, the first UE capability specification is reported by the terminal device to the network device after the terminal device receives a first UE capability query message sent by the network device.

Step S505: The network device sends a second UE capability query message to the terminal device.

Step S506: The terminal device sends a second UE capability message to the network device. The second UE capability message includes the second UE capability specification.

Step S507: The network device reallocates, to the terminal device based on the second UE capability specification, RRC configuration information supported by the terminal device.

Step S508: The terminal device reports identification information of the network device and the second UE capability specification to a server.

Step S509: The terminal device may perform re-registration to report an initial UE capability specification of the terminal device to a network device after handover when determining that the network device after handover is not an abnormal network device.

In conclusion, in this embodiment of this application, when the terminal device determines that the RRC configuration information delivered by the network device cannot be compatible, the terminal device rolls back the first UE capability specification previously reported to the network device to obtain the second UE capability specification, and reports the second UE capability specification to the network device, so that the network device reallocates, to the terminal device based on the second UE capability specification, the RRC configuration information supported by the terminal device. This helps quickly establish a communication link between the terminal device and the network device, to improve user experience.

Figure 6:
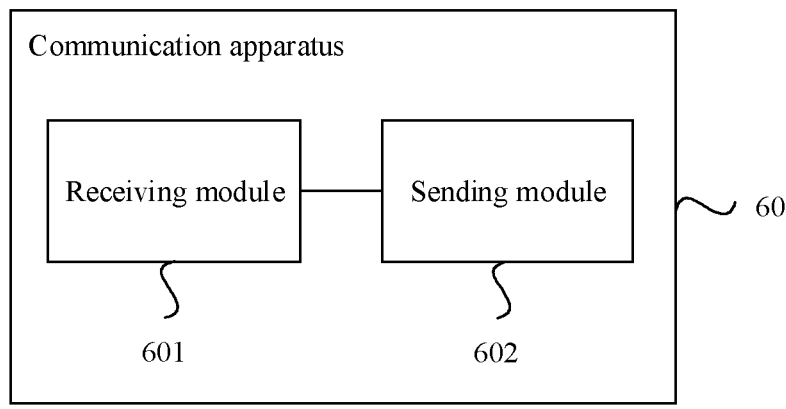
FIG. 6 is a schematic structural diagram of a communication apparatus according to an embodiment of this application.

FIG. 6 is a schematic structural diagram of a communication apparatus according to an embodiment of this application. Optionally, the communication apparatus provided in this embodiment of this application may be used in a terminal device. As shown in FIG. 6, the communication apparatus 60 provided in this embodiment may include a receiving module 601 and a sending module 602.

The receiving module 601 is configured to receive a user equipment UE capability query message sent by a network device.

The sending module 602 is configured to send a first UE capability message to the network device when the receiving module receives the UE capability query message.

The sending module 602 is further configured to send a second UE capability message to the network device when determining that a network exception occurs. A second UE capability specification in the second UE capability message is lower than a first UE capability specification in the first UE capability message.

In a possible implementation, the sending module 602 is specifically configured to:

send the second UE capability message to the network device when detecting that identification information of the network device and a corresponding UE capability compatibility specification are included in a server and that the UE capability compatibility specification is lower than the first UE capability specification, where the UE capability compatibility specification is used to indicate a UE capability specification compatible with the network device.

In a possible implementation, the sending module 602 is specifically configured to:

send the second UE capability message to the network device when no response from the network device is received within preset duration after the first UE capability message is sent to the network device.

In a possible implementation, the sending module 602 is specifically configured to:

send the second UE capability message to the network device when detecting that the network device releases a radio resource control RRC connection to the terminal device.

In a possible implementation, the second UE capability specification is determined by the communication apparatus based on the UE capability compatibility specification that corresponds to the network device and that is stored in the server, and the UE capability compatibility specification is used to indicate the UE capability specification compatible with the network device.

In a possible implementation, if the first UE capability specification includes a first carrier aggregation CA band combination quantity, a second CA band combination quantity in the second UE capability specification is less than the first CA band combination quantity.

In a possible implementation, if the first UE capability specification includes a first category level, a second category level in the second UE capability specification is lower than the first category level.

In a possible implementation, if the first UE capability specification includes a first protocol release, a release number of a second protocol release in the second UE capability specification is earlier than a release number of the first protocol release.

In a possible implementation, if the first UE capability specification supports evolved UMTS terrestrial radio access and new radio dual connectivity EN-DC, the second UE capability specification does not support the EN-DC.

In a possible implementation, the sending module 602 is specifically configured to:
send the second UE capability message to the network device when RRC configuration information received from the network device includes configuration information that cannot be supported by the terminal device.

In a possible implementation, the second UE capability specification is obtained after the communication apparatus disables an air interface corresponding to the configuration information that cannot be supported by the terminal device and that is included in the RRC configuration information.

In a possible implementation, the sending module 602 is further configured to report the identification information of the network device and the second UE capability specification to the server.

In a possible implementation, the sending module 602 is further configured to report an initial UE capability specification of the terminal device to a network device after handover when determining that the network device after handover is not an abnormal network device.

The communication apparatus in this embodiment of this application may be configured to execute the technical solutions of the terminal device in the foregoing communication method embodiments of this application. Implementation principles and technical effects thereof are similar, and details are not described herein again.

An embodiment of this application further provides a baseband processor. The baseband processor is configured to execute the technical solutions of the terminal device in the foregoing communication method embodiments of this application. Implementation principles and technical effects thereof are similar, and details are not described herein again.

An embodiment of this application further provides a chip system. The chip system includes a processor, and may further include a memory. The chip system is configured to implement the technical solutions of the terminal device in the foregoing communication method embodiments of this application. Implementation principles and technical effects thereof are similar, and details are not described herein again. Optionally, the chip system may include a chip, or may include a chip and another discrete device.

An embodiment of this application further provides a terminal device, including the baseband processor provided in the foregoing embodiment or the chip system provided in the foregoing embodiment.

Figure 7:
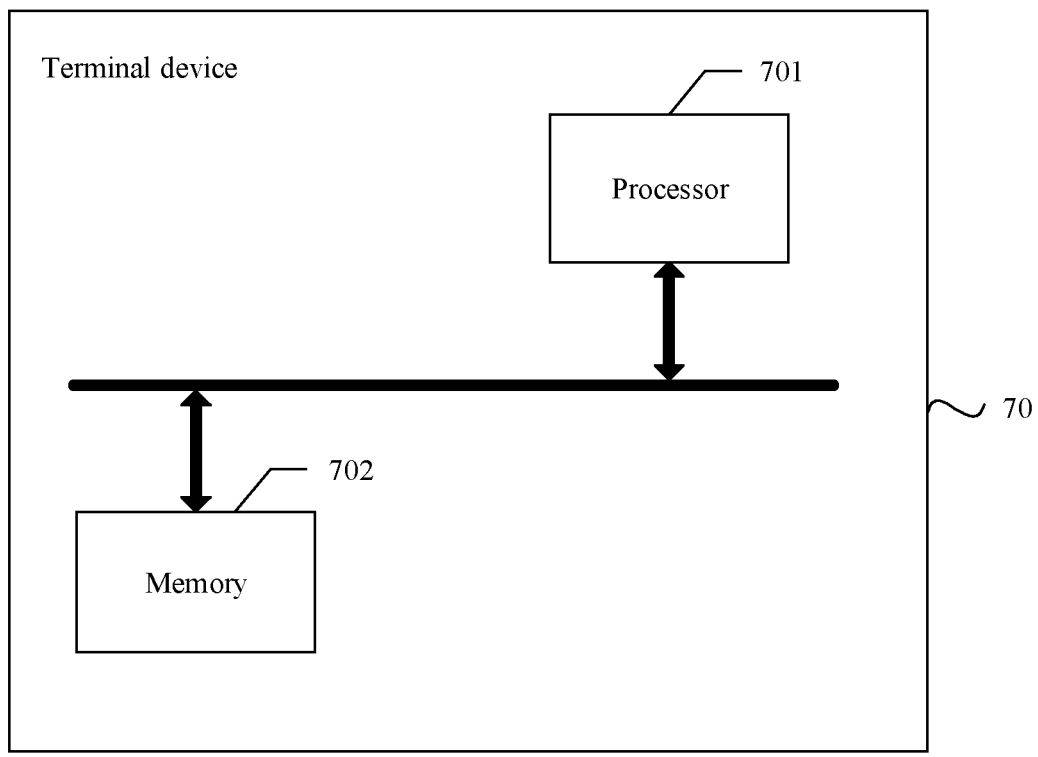
FIG. 7 is a schematic structural diagram of a terminal device according to an embodiment of this application.

FIG. 7 is a schematic structural diagram of a terminal device according to an embodiment of this application. As shown in FIG. 7, the terminal device 70 provided in this embodiment may include a processor 701 and a memory 702.

The memory 702 is configured to store a program instruction.

The processor 701 is configured to invoke and execute the program instruction stored in the memory 702. When the processor 701 executes the program instruction stored in the memory 702, the terminal device 70 is configured to execute the technical solutions in the foregoing communication method embodiments of this application. Implementation principles and technical effects thereof are similar, and details are not described herein again.

It may be understood that FIG. 7 shows only a simplified design of the terminal device. In another implementation, the terminal device may further include any quantity of transceivers, processors, memories, and/or communication units. This is not limited in this embodiment of this application.

An embodiment of this application further provides a program. When the program is executed by a processor, the program is used to execute the technical solutions in the foregoing communication method embodiments of this application. Implementation principles and technical effects thereof are similar, and details are not described herein again.

An embodiment of this application further provides a computer program product including instructions. When the computer program product is run on a computer, the computer is enabled to perform the technical solutions in the foregoing communication method embodiments of this application. Implementation principles and technical effects thereof are similar, and details are not described herein again.

An embodiment of this application further provides a computer-readable storage medium. The computer-readable storage medium stores instructions. When the instructions are run on a computer, the computer is enabled to perform the technical solutions in the foregoing communication method embodiments of this application. Implementation principles and technical effects thereof are similar, and details are not described herein again.

In the several embodiments provided in this application, it should be understood that the disclosed apparatus and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of hardware and a software function unit.

When the foregoing integrated unit is implemented in a form of a software function unit, the integrated unit may be stored in a computer-readable storage medium. The software function unit is stored in a storage medium and includes several instructions for enabling a computer device (which may be a personal computer, a server, a network device, or the like) or a processor (processor) to perform some steps of the methods in the embodiments of this application. The foregoing storage medium includes various media that can store program code, such as a USB flash drive, a removable hard disk, a read-only memory (Read-Only Memory, ROM), a random access memory (Random Access Memory, RAM), a magnetic disk, or an optical disc.

It may be clearly understood by a person skilled in the art that, for the purpose of convenient and brief description, division of the foregoing function modules is taken as an example for illustration. During actual application, the foregoing functions can be allocated to different function modules and implemented according to a requirement, that is, an inner structure of an apparatus is divided into different function modules to implement all or a part of the functions described above. For a detailed working process of the foregoing apparatus, refer to a corresponding process in the foregoing method embodiments. Details are not described herein again.

A person of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or a part of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, a network device, a terminal device, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A communication method by a terminal device, comprising:
   receiving a user equipment UE capability query message from the network device;
   in response to the receiving step, sending a first user equipment (UE) capability message to a network device;
   determining that the network device capability is not compatible with the terminal device and that the network device capability is lower than the terminal device capability;
   in response to the determining step, sending a second UE capability message to the network device;
   wherein:
   the determining step includes determining that a network exception occurs and wherein a second UE capability specification in the second UE capability message is lower than a first UE capability specification in the first UE capability message; and
   the sending a second UE capability message to the network device when determining that a network exception occurs comprises sending the second UE capability message to the network device when radio resource control RRC configuration information received from the network device comprises configuration information that is not supported by the terminal device; and
   wherein if the first UE capability specification comprises a first category level, a second category level in the second UE capability specification is lower than the first category level.

2. The method according to claim 1, wherein the sending the second UE capability message to the network device comprises:
   detecting that identification information of the network device and a corresponding UE capability compatibility specification are comprised in a server and that the UE capability compatibility specification is lower than the first UE capability specification; and
   sending the second UE capability message to the network device wherein the UE capability compatibility specification is used to indicate a UE capability specification compatible with the network device.

3. The method according to claim 1, wherein the sending a second UE capability message to the network device when determining that a network exception occurs comprises:
   sending the second UE capability message to the network device when no response from the network device is received within preset duration after the first UE capability message is sent to the network device.

4. The method according to claim 1, wherein the sending a second UE capability message to the network device when determining that a network exception occurs comprises:
   sending the second UE capability message to the network device when detecting that the network device releases a radio resource control (RRC) connection to the terminal device.

5. The method according to claim 1, wherein if the first UE capability specification comprises a first carrier aggregation (CA) band combination quantity, a second CA band combination quantity in the second UE capability specification is less than the first CA band combination quantity.

6. The method according to claim 1, wherein if the first UE capability specification comprises a first protocol release, a release number of a second protocol release in the second UE capability specification is earlier than a release number of the first protocol release.

7. The method according to claim 1, wherein if the first UE capability specification supports evolved universal mobile telecommunications system terrestrial radio access and new radio dual connectivity (EN-DC), the second UE capability specification does not support the EN-DC.

8. The method according to claim 1, wherein the second UE capability specification is obtained after an air interface corresponding to the configuration information that is not supported by the terminal device.

9. A terminal device, including a processor and a memory, wherein:
   the memory is configured to store program instructions, and the processor is configured to execute the program instructions stored in the memory, when the program instruction is executed the terminal device is configured to perform the steps of:

sending a first user equipment (UE) capability message to a network device in response to receiving a user equipment UE capability query message from the network device; and determining that the network device capability is not compatible with the terminal device and that the network device capability is lower than the terminal device;

in response to the determining step, sending a second UE capability message to the network device;

wherein:

the determining step includes determining that a network exception occurs and wherein a second UE capability specification in the second UE capability message is lower than a first UE capability specification in the first UE capability message; and the sending a second UE capability message to the network device when determining that a network exception occurs comprises sending the second UE capability message to the network device when radio resource control RRC configuration information received from the network device comprises configuration information that is not supported by the terminal device; and wherein if the first UE capability specification comprises a first category level, a second category level in the second UE capability specification is lower than the first category level.

10. The terminal device according to claim 9, wherein the sending a second UE capability message to the network device when determining that a network exception occurs comprises:

sending the second UE capability message to the network device when detecting that identification information of the network device and a corresponding UE capability compatibility specification are comprised in a server and that the UE capability compatibility specification is lower than the first UE capability specification, wherein the UE capability compatibility specification is used to indicate a UE capability specification compatible with the network device.

11. The terminal device according to claim 9, wherein the sending a second UE capability message to the network device when determining that a network exception occurs comprises:

sending the second UE capability message to the network device when no response from the network device is received within preset duration after the first UE capability message is sent to the network device.

12. The terminal device according to claim 9, wherein the sending a second UE capability message to the network device when determining that a network exception occurs comprises:

sending the second UE capability message to the network device when detecting that the network device releases a radio resource control (RRC) connection to the terminal device.

13. The terminal device according to claim 9, wherein if the first UE capability specification comprises a first carrier aggregation (CA) band combination quantity, a second CA band combination quantity in the second UE capability specification is less than the first CA band combination quantity.

14. The terminal device according to claim 9, wherein if the first UE capability specification comprises a first protocol release, a release number of a second protocol release in the second UE capability specification is earlier than a release number of the first protocol release.

15. The terminal device according to claim 9, wherein if the first UE capability specification supports evolved universal mobile telecommunications system terrestrial radio access and new radio dual connectivity (EN-DC), the second UE capability specification does not support the EN-DC.

16. A computer-readable storage medium, wherein the computer-readable storage medium comprises instructions, that when executed by a processor, cause a device to perform the steps of:

sending a first user equipment (UE) capability message to a network device when receiving a user equipment UE capability query message from the network device;

determining that the network device capability is not compatible with the terminal device and that the network device capability is lower than the terminal device;

in response to the determining step, sending a second UE capability message to the network device;

wherein: the determining step includes determining that a network exception occurs and wherein a second UE capability specification in the second UE capability message is lower than a first UE capability specification in the first UE capability message; and the sending a second UE capability message to the network device when determining that a network exception occurs comprises sending the second UE capability message to the network device when radio resource control RRC configuration information received from the network device comprises configuration information that is not supported by the terminal device; and wherein if the first UE capability specification comprises a first category level, a second category level in the second UE capability specification is lower than the first category level.

* * * * *